United States Patent [19]

Hampton

[11] 4,060,981
[45] Dec. 6, 1977

[54] DIVERTER VALVE FOR COANNULAR FLOWS

[75] Inventor: Thomas L. Hampton, Cincinnati, Ohio

[73] Assignee: General Electric Company, Cincinnati, Ohio

[21] Appl. No.: 691,314

[22] Filed: June 1, 1976

[51] Int. Cl.$^2$ .............................................. F02K 3/02
[52] U.S. Cl. .................... 60/226 R; 60/244; 415/153 A; 137/862; 137/875
[58] Field of Search ................. 60/226 R, 244, 224; 415/153 A; 137/608–612.1

[56] References Cited

U.S. PATENT DOCUMENTS

| 3,147,773 | 9/1964 | Matthews et al. | 137/612 |
| 3,331,394 | 7/1967 | Hefler et al. | 137/875 |
| 3,792,584 | 2/1974 | Klees | 60/226 R |
| 3,854,286 | 12/1974 | Klees | 60/226 R |
| 3,938,328 | 2/1976 | Klees | 60/226 R |
| 3,972,349 | 8/1976 | Tumavicus | 60/226 R |

Primary Examiner—William L. Freeh
Assistant Examiner—Robert E. Garrett
Attorney, Agent, or Firm—Robert C. Lampe, Jr.; Derek P. Lawrence

[57] ABSTRACT

A valve for controlling the fluid flow between two generally coannular ducts. The valve is provided with a pair of back-to-back, mutually facing flow mixers of the daisy variety, each associated with a section of the coannular ducts. Each mixer transits the two coannular duct passages into a plurality of circumferentially separated chute passages communicating alternatively with the inner and outer ducts, the mixers being indexed with respect to each other by half a chute width. A stage of radially extending, pivotable vanes cooperates with the chutes of both mixers and allows both the inner and outer upstream duct flows to be directed to either the inner or outer downstream duct, depending upon the orientation of the vanes. Alternatively, either or both of the fluid streams can be blocked off entirely. Complete flexibility for flow inversion is obtained without turning or indexing the flow through the vanes by more than half a chute width, thereby maintaining high efficiency.

12 Claims, 6 Drawing Figures

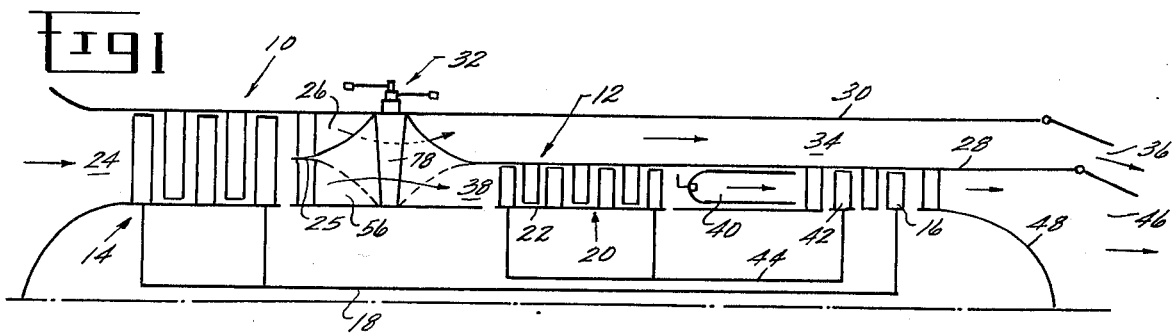
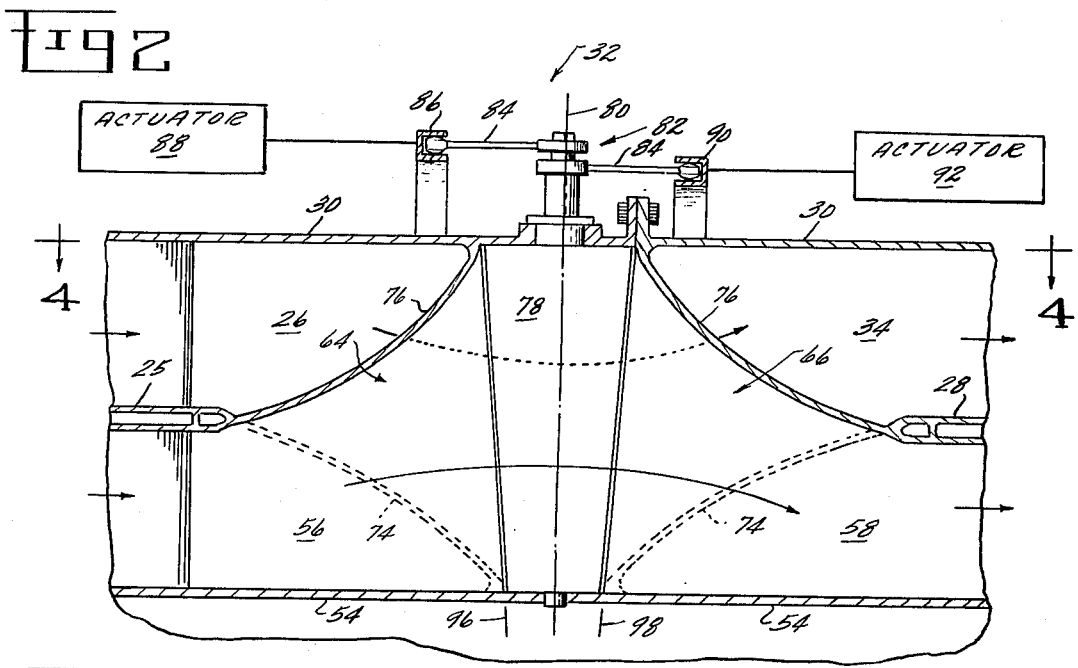
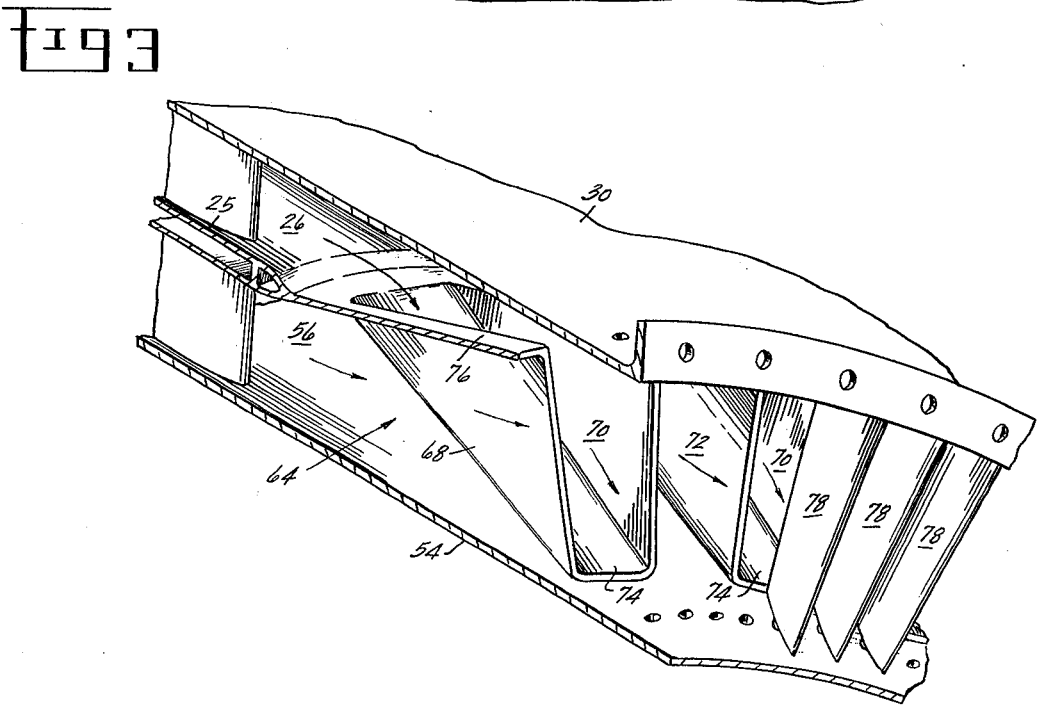

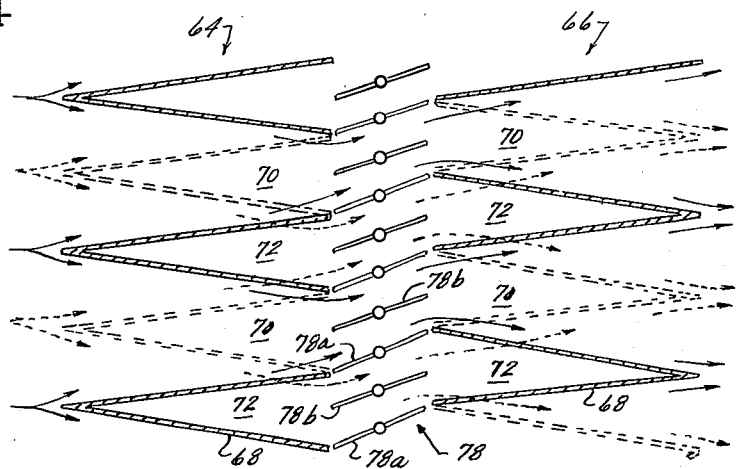
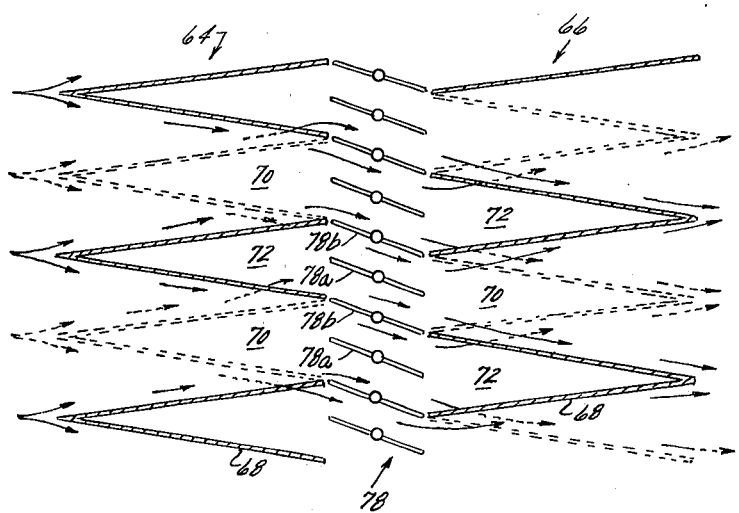
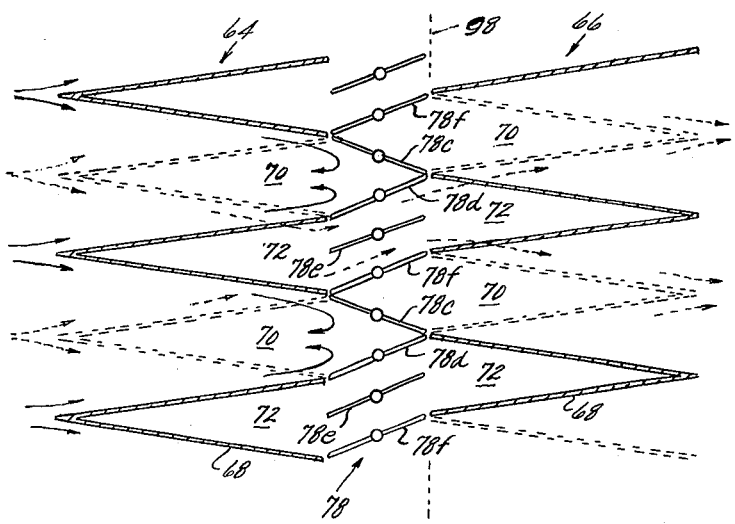

DIVERTER VALVE FOR COANNULAR FLOWS

BACKGROUND OF THE INVENTION

The present invention relates to fluid flow valves and, more particularly, to valves for controlling the flow relationships within generally coannular ducts.

Recent studies in variable cycle gas turbine engines indicate that flow switching valves of various types will be required for flow modulation. A variable cycle engine is one which is performance optimized at more than one operating condition through the variability in geometry of specified engine components. In variable cycle engines of the gas turbofan variety wherein a pressurized fan stream bypasses a core engine stream, it is foreseeable that future requirements will necessitate that the streams be inverted, for performance optimization, somewhere along their respective duct lengths. This will require a valve which, as a minimum, will invert the flows between the coannular streams. Preferably, the valves should be able to modulate the flow rates through the ducts and, if necessary, block the flow in one or more of the ducts. Furthermore, adaptation to a gas turbine engine requires that such a valve be of lightweight construction and efficient in performance.

Simply presented, the problem is to develop a valve which receives the independent, separated flows from two concentric upstream annular ducts and directs the two independent, and still separated, flows into two downstream concentric annular ducts with the option of inverting the flow relationship at will. In its basic concept, the solution will find application not only in advanced gas turbine engines, but also in other ducted flow situations such as heating and air conditioning installations.

Previous attempts to solve similar problems have been unsuccessful and impractical due to their inherent complexity or inefficiency. It has been recognized that flow turning induces flow pressure losses which, in turn, leads to inefficiency. Thus, any potential valve system should minimize flow turning. One solution to the problem appears in U.S. Pat. No. 3,792,584 — Klees wherein flow switching is accomplished by relative circumferential rotation of two chuted coannular duct sections such that the flows always pass straight through the interface plane. While such a scheme is theoretically optimized from the efficiency point of view, it is somewhat cumbersome to carry into practice on a gas turbofan engine since it requires circumferential rotation of large duct sections, possibly up to eight feet in diameter. An actuation system capable of rotating such a large duct and also capable of withstanding flight maneuver loadings would be heavy indeed. Alternatively, it has been suggested by Klees that while flapper valves could be employed between spaced apart sections of coannular ducts, such valves would be fully efficient in only one position where the flow remained straight between valve portions, the implication being that in any other position, the required turning and, thus, inefficiency would be so great as to be impractical. Thus, the requirement exists for practical lightweight valves which will allow for complete flow modulation and inversion in coannular ducts.

SUMMARY OF THE INVENTION

Accordingly, it is the primary object of the present invention to provide a practical valve for inverting the flows within coannular ducts in an efficient manner.

It is another object of the present invention to provide a valve which will selectively direct flow from one of two upstream coannular ducts into either of two downstream coannular ducts.

It is yet another object of the present invention to provide a valve which will selectively shut off the flow in one of two upstream coannular ducts while directing the flow from the remaining upstream duct into either of two downstream coannular ducts.

It is still another object of the present invention to provide a valve which is capable of selectively shutting off all of the flow in coannular ducts.

These and other objects and advantages will be more clearly understood from the following detailed description, drawings and specific examples, all of which are intended to be typical of rather than in any way limiting to the scope of the present invention.

Briefly stated, the above objectives are accomplished by employing a pair of conventional daisy mixers of the type described and taught in U.S. Pat. No. 3,377,804 — J. D. Wright et al, which is assigned to the assignee of the present invention and the subject matter of which is incorporated herein by reference. These mixers are placed back to back in association with longitudinally separated coaxial duct sections. Each mixer transists the two coannular passages associated with each coannular duct section into a single annular height, but of circumferentially separated chute passages, alternating chutes being in fluid communication with the inner and outer ducts. The mixers possess equal numbers of chutes, $n$, but are permanently indexed circumferentially with respect to each other by no more than $360°/2n$ (i.e., half a chute width). A stage of radially extending vanes, numbering at least $2n$ in amount, is placed between the two separated, mutually facing sets of chutes, the vanes being pivotable about their longitudinal (i.e., radial) axes.

In the conventional, unswitched mode, flow discharged from the upstream mixer chutes is directed into corresponding chutes of the downstream, reversed mixer by the vanes which are oriented to deflect the flow circumferentially only half a chute width. Since there are twice as many vanes as chutes, there is an "idler" vane in the center of each pair of "active" vanes which form the flow passages between chutes. When the vanes are actuated such that the vane edges rotate circumferentially a distance of only half a chute passage width, the active and idler vanes reverse roles and the flow into the downstream reverse mixer is directed by the vanes into the chutes that are immediately adjacent to those used in the conventional mode, thereby inverting flow between the inner and outer passages. In gas turbine engines, this alternate mode is particularly useful in the variable cycle engine. For these turbofan engines wherein the bypass ratio is greater than one, this mode also allows directing the greater volume of flow from the inlet outer annulus into the core engine, thereby providing more available energy to the core engine in an in-flight windmill start situation.

By selectively rotating every fourth vane half a chute passage width in the direction opposite to the remaining vanes, the flow in one of the upstream ducts can be shut off and the flow from the remaining upstream duct routed to either of the two downstream coannular ducts through their respective mixer chutes. Thus, at least four flow alternatives are possible depending upon which vanes of each sector are chosen. A system of actuator arms and idler arms provides selective actuation of the vanes.

In yet another embodiment, if every other vane is rotated opposite to its next adjacent vane by an amount equal to half a chute width, all flow in both coannular ducts will be stopped.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

FIG. 1 diagrammatically depicts in cut-away a gas turbine engine incorporating the subject invention;

FIG. 2 is an enlarged simplified view of the novel flow valve of the engine of FIG. 1;

FIG. 3 is a detailed isometric view of a representative mixer incorporated into the valve of FIG. 2;

FIG. 4 is a simplified roll-out view taken along line 4—4 of FIG. 2 depicting the fluid flow through the ducts of the engine of FIG. 1 with the subject valve in one operative position (i.e., conventional mode without flow inversion);

FIG. 5 is a schematic view, similar to FIG. 4, with the valve in a second operative position (i.e., inverted flow mode); and FIG. 6 is an alternative embodiment of the subject invention wherein the valve is configured to yet another operative condition.

DESCRIPTION OF THE PREFERRED EMBODIMENT

Referring to the drawings wherein like numerals correspond to like elements throughout, reference is first directed to FIG. 1 wherein a gas turbofan engine depicted generally at 10 and embodying the subject matter of the present invention is diagrammatically shown. This engine may be considered as comprising generally a core engine 12, a fan assembly 14, and a fan turbine 16 which is interconnected to fan assembly 14 by shaft 18. The core engine 12 includes an axial flow compressor 20 having a rotor 22. Air enters inlet 24, is initially compressed by fan assembly 14 and divided by flow splitter 25 into two portions entering valve 32, to be more fully described hereinafter. In the normal operating mode of the valve, as indicated by the arrows, the first portion of this compressed air passes through valve 32 and enters outer bypass duct 34 defined, in part, by annular wall 28 of core engine 12 and a circumscribing annular wall 30, and is discharged through an outer nozzle 36. The second portion of the compressed air passes through valve 32 into core engine inlet 38, is further compressed by the axial flow compressor 20, and passes to a combustor 40 where fuel is burned to provide high energy combustion gases which drive a turbine 42. The turbine 42, in turn, drives the rotor 22 through a shaft 44 in the usual manner of a gas turbine engine. The hot gases of combustion then pass to and drive the fan turbine 16 which, in turn, drives the fan assembly 14. A propulsive thrust is thus obtained by the action of the fan assembly 14 discharging air from the outer annular bypass duct 34 through nozzle 36 and by the discharge of combustion gases from the inner coannular engine nozzle 46 defined, in part, by plug 48. The above description is merely meant to provide an illustrative example of one embodiment of the present invention and is not meant to be limiting, as it will become readily apparent from the following description that the present invention is capable of application to any apparatus comprising coannular fluid flow ducts.

In particular, consider now FIG. 2 wherein the valve portion 32 of engine 10 is shown in an enlarged, simplified form. Depicted therein is outer annular wall 30 which, in cooperation with splitter 25 and annular wall 28, defines coannular upstream outer duct section 26 and downstream outer duct section 34. In a similar manner, annular structural wall 54, in cooperation with splitter 25 and annular wall 28, defines coannular upstream and downstream inner duct sections 56 and 58, respectively.

Valve 32 comprises, in part, a pair of back-to-back mixers 64 and 66 of the well-known "daisy" variety more fully described in the aforementioned U.S. Pat. No. 3,377,804, Wright et al. Directing attention to FIG. 3, the upstream coannular ducts 26, 56 and associated mixer 64 are shown in a simplified isometric view. Briefly, the mixer comprises a plurality of generally longitudinally extending tapered panels 68, the downstream termini of which extend across the entire annulus between walls 30 and 54 to partially define separate flow chutes 70, 72. The upstream apex of each panel 68 is attached to flow splitter 25. A plurality of ramps 74 between every other pair of panels 68 and extending from flow splitter 25 to inner wall 54 completes the definition of chutes 70 while similar ramps 76 extending from flow splitter 25 outwardly to outer wall 30 complete alternate chutes 72. Thus, mixer 64 transists the concentric annular ducts 26, 56 into a single annular height of circumferentially separated, distinct chutes, alternating chutes being in fluid communication with the inner and outer ducts.

Mixer 66 is substantially identical to mixer 64 except that it is faced in the opposite direction and its chutes are associated alternately with coannular downstream ducts 34 and 58 partially defined by intermediate annular wall 28. Both mixers possess an equal number of chutes 70, 72 herein numbering $n$ for sake of example, but the chutes of the downstream mixer 66 are permanently indexed circumferentially with respect to the chutes of the upstream mixer 64 by an amount equal to $360°/2n$, which amounts to half a chute passage width, for reasons to be discussed.

A stage of radially extending vanes 78 is disposed between the two separated, mutually facing sets of mixer chutes (FIGS. 2 and 3), the vanes extending across the entire annulus between walls 30 and 54 and being pivotable about their respective longitudinal axes 80, the longitudinal axes extending in the radial direction. Preferably, there are twice as many vanes as chutes, and rotation of the vanes is provided by an actuator means soon to be described.

FIG. 4 shows a roll-out view taken along line 4—4 of FIG. 2 looking down on the valve system just described, depicting the upstream separated chutes 70, 72 of upstream mixer 64 on the left and the downstream chutes 70, 72 of downstream mixer 66 on the right, with vanes 78 in between. Note that the upstream and downstream chutes are indexed circumferentially one-half chute width with respect to each other. In the conventional operating mode wherein the inner and outer flow streams are not inverted, the flow discharged from upstream chutes 70, 72 is directed by vanes 78 into downstream chutes 70, 72, respectively, the flow being diverted no more than 360°/2n (i. e., half a chute width). Note that the flow passages connecting cooperating chutes are defined by every other vane 78a, and that there is an "idler" vane 78b in the center of each passage in general alignment with the flow.

When the vanes are actuated in unison so that the vane edges rotate circumferentially a distance equal to half a chute width, the flow into the downstream mixer 66 is directed by the vanes into the chutes that are circumferentially adjacent to those used in the conventional mode. In other words, upstream chutes 70 are placed in fluid communication with downstream chutes 72, and upstream chutes 72 are placed in fluid communication with downstream chutes 70. This configuration is diagrammatically shown in FIG. 5. Thus, the flows are inverted since the outer upstream flow is directed to the inner downstream duct and vice versa. In such a mode, the active and idler vanes reverse roles and, again, the flow is turned by no more than half a chute width.

In the embodiments of FIGS. 4 and 5, all of the vanes are ganged together to rotate in unison. This may be accomplished by actuator means 82 having an actuator arm 84 attached to each vane, with all the actuator arms being ganged to a first unison ring 86. Thus, displacement of the unison ring by any known actuator 88, such as a hydraulic actuator, would cause simultaneous, equal rotation of each vane.

With a minor addition of complexity, a significantly greater degree of flexibility can be introduced into the valve. Some potential applications will not only require that one of the duct flows be of either the inverted or straight-through type, but that the other duct flow be terminated entirely. FIG. 6 proposes a method for obtaining this capability by a slight modification to the valve of FIGS. 4 and 5. In this embodiment, every fourth vane 78c with its associated actuator arm is isolated from the first unison ring 86. These isolated vanes and arms are instead joined to an independently controlled second unison ring 90, controlled by actuator 92 of a known variety. For the sake of clarity, the vanes are sequentially labeled 78c, 78d, 78e and 78f, with vanes 78c connected to unison ring 90, and the remaining vanes connected to unison ring 86. By independently actuating unison ring 90 to rotate vanes 78c opposite to the remaining vanes, it is possible to block off the outer duct flow at plane 98 formed at the upstream edge of the downstream mixer 66 where the trailing edges of adjacent vanes 78c and 78d come together to block alternating circumferentially spaced chutes 70. The inner duct flow through chutes 72 is unaffected by this blockage of the outer flow and is again rotated only half a chute width by the guide vanes. In a similar manner, isolation and ganging of other vane combinations can allow complete flexibility of the valve. Both the inner and outer upstream flows can be directed to either the inner or outer downstream duct, and either or both can be blocked off entirely. The following tabulation lists the potential combinations with respect to FIG. 6:

| Upstream-to-downstream duct relationship | Vane orientation |
| --- | --- |
| Inner-to-inner Outer-to-outer | All vanes / |
| Inner-to-outer Outer-to-inner | All vanes \ |
| Inner-to-inner Outer shut off | 78c 78d, 78e, 78f |
| Inner shut off Outer-to-outer | 78e 78c, 78d, 78f |
| Inner-to-outer Outer shut off | 78c, 78e, 78f 78d |
| Inner shut off Outer-to-inner | 78c, 78d, 78e 78f |
| Inner shut off Outer shut off | 78c, 78e 78d, 78f |

In order to minimize leakage at plates 96, 98 (FIG. 2) between vanes 78 and mixers 64 and 66, respectively, it is recommended that the vane edges fall along lines projected from the intersection of the common coannular duct centerline (not shown) and the vane rotational centerline 80. The mixer edges are parallel to the vane edges. Preferably, the outer (30) and inner (54) flow path contours between plates 96 and 98 should be spherical surfaces about the aforementioned intersection point to minimize leakage across the vane ends at all positions of actuation.

Thus, in operation, the present valve accomplishes flow inversion and modulation in a much simplier, efficient and practical manner than heretofore. Since the amount of flow turning through the vanes never exceeds half a chute passage width, losses may be kept extremely low, particularly where a large number of chutes are employed. Furthermore, cumbersome duct rotation has been eliminated. Since many gas turbine engines employ variable pitch guide vanes and stators in their fans and compressors, incorporation of the present valve mechanism into an engine is easily with the manufacturer's capability.

It will be obvious to one skilled in the art that certain changes can be made to the above-described invention without departing from the broad inventive concepts thereof. For example, the present invention is not limited in application to gas turbine engines, but could find application in heating and air-conditioning systems, and other ducted flow configurations. Additionally, the type of vane actuation means depicted herein is by way of example only, and many alternative actuators and flow split arrangements may be employed and still remain within the scope of the present invention. It is intended that the appended claims cover these and all other variations in the present invention's broader inventive concepts.

Having thus described the invention, what is claimed as novel and desired to be secured by Letters Patent of the U.S. is:

1. A valve for controlling the fluid flow between axially separated upstream and downstream sections of generally coannular inner and outer ducts, comprising:
   a pair of flow mixers, one associated with each coannular duct section and each terminating in a set of flow chutes numbering $n$ in amount extending substantially across and around the section annulus, alternating chutes being in fluid communciation with the inner and outer ducts of their respective sections, and wherein the chutes of each section open toward each other and are fixedly indexed circumferentially with respect to each other by 360°/2n, a stage of radially extending vanes numbering 2n in amount, disposed between the mutually facing sets of chutes, said vanes pivotable about their longitudinal axes; and means for actuating said vanes to selectively turn the flow exiting the chutes associated with at least one of said upstream chutes by no more than half a chute width into the chutes associated with either the inner or outer duct of the downstream section.

2. The valve as recited in claim 1 wherein said actuator means comprises a unison ring operatively connected to each vane and a means for producing displacement of said unison ring to effect selective adjustment of said vanes.

3. The valve as recited in claim 2 wherein said vanes are movable, by said actuator means, between two positions in which alternate vanes function as active vanes partially defining flow passages through said valve and the remaining vanes function as idler vanes in general alignment with the flow at the center of each such passage.

4. The valve as recited in claim 3 wherein the active vanes and the idler vanes change roles as all of the vanes are pivoted between said two positions, the first position being one in which each chute of the upstream section is in fluid communication with a downstream chute circumferentially indexed therefrom by an amount equal to 360°2n, and the second position being one in which each chute of the upstream section is in fluid communication with the next adjacent chute to that of the first vane position.

5. The valve as recited in claim 1 wherein said actuator means comprises a first unison ring operatively connected to a first plurality of said vanes, a second unison ring operatively connected to a second plurality of said vanes, and means for producing independent relative displacement of said unison rings to effect selective adjustment of said vanes.

6. The valve as recited in claim 5 wherein said first plurality comprises every fourth vane and said second plurality comprises the remaining vanes.

7. The valve as recoited in claim 6 wherein said unison rings are displaced to put alternate upstream ducts in fluid communication with alternate downstream ducts through passages formed by said second plurality of vanes, and wherein said first plurality of vanes cooperates with preselected vanes of said second plurality to substantially block the flow from the other of the upstream ducts.

8. The valve as recited in claim 5 wherein said first plurality comprises every other vane and said second plurality comprises the remaining vanes.

9. The valve as recited in claim 8 wherein said unison rings are displaced to pivot the first plurality of vanes in a direction opposite to that of the second plurality, thereby substantially blocking the flow from both said inner and said outer upstream ducts.

10. The valve as recited in claim 2 wherein said actuator means comprises an actuator arm connected to a first vane, said arm extending generally perpendicular to the longitudinal axis thereof, and wherein said unison ring is connected to said arm.

11. The valve as recited in claim 1 wherein the ends of the chutes are substantially parallel to the edges of the vanes.

12. The valve as recited in claim 11 wherein the edges of each vane fall substantially along lines projected from the intersection of the vane longitudinal axes and the common coannular duct centerline, and in close axial proximity with, the ends of the chutes.

* * * * *

UNITED STATES PATENT AND TRADEMARK OFFICE
CERTIFICATE OF CORRECTION

PATENT NO. : 4,060,981
DATED : December 6, 1977
INVENTOR(S) : Thomas L. Hampton

It is certified that error appears in the above-identified patent and that said Letters Patent are hereby corrected as shown below:

Column 7, line 28, "360°2n" should be --360°/2n--.

Column 8. line 6. "recoited" should be --recited--.

Signed and Sealed this

Fourth Day of April 1978

[SEAL]

Attest:

RUTH C. MASON
Attesting Officer

LUTRELLE F. PARKER
Acting Commissioner of Patents and Trademarks